United States Patent [19]

Streander

[11] 4,002,541
[45] Jan. 11, 1977

[54] SOLAR ENERGY ABSORBING ARTICLE AND METHOD OF MAKING SAME

[75] Inventor: George W. Streander, Alamogordo, N. Mex.

[73] Assignee: Design Systems, Inc., Alamogordo, N. Mex.

[22] Filed: Jan. 31, 1975

[21] Appl. No.: 545,735

Related U.S. Application Data

[63] Continuation-in-part of Ser. No. 303,393, Nov. 3, 1972, abandoned, which is a continuation-in-part of Ser. No. 210,072, Dec. 22, 1971, abandoned.

[52] U.S. Cl. .............................. 204/33; 148/6.27; 428/331
[51] Int. Cl.² ......................................... C25D 5/44
[58] Field of Search ............... 204/33; 427/77, 160; 148/6.27; 126/270, 271; 428/331

[56] References Cited

UNITED STATES PATENTS 3,400,057  9/1968  Coates et al. ..................... 204/33

Primary Examiner—R. L. Andrews
Attorney, Agent, or Firm—Ancel W. Lewis, Jr.

[57] ABSTRACT

An anodized article and method of absorbing solar energy comprises an alloy layer of aluminum containing up to 18% by weight silicon having a surface matrix layer of aluminum oxide and crystals of silicon dioxide grown from the alloy extending through, bound in and supported by the aluminum oxide matrix. The anodized article may be made by etching the alloy layer to expose virgin alloy and particularly silicon and electrochemically anodizing the etched alloy to grow silicon dioxide crystals and to form an aluminum oxide supporting matrix around the crystals.

18 Claims, 3 Drawing Figures

SOLAR ENERGY ABSORBING ARTICLE AND METHOD OF MAKING SAME

This is a continuation-in-part of my co-pending application Ser. No. 303,393, filed Nov. 3, 1972 which was a continuation-in-part of my co-pending application Ser. No. 210,072 filed Dec. 22, 1971 both now abandoned.

BACKGROUND OF THE INVENTION

1. Field of the Invention

The present invention relates to an anodized article and method and more particularly, to aluminum-silicon alloys having a surface comprised of grown silicon dioxide crystals held in a supporting matrix of aluminum oxide, abrasive tools, aircraft skins, a solar energy absorbing article and method, and to methods of making the same.

2. Description of the Prior Art

Tools used by precision machinists and instrument makers are known to be difficult to use. Precise cuts with such tools often require years of experience by the user, as well as the use of a lubricant to prevent loading and binding. One difficulty in the manufacture of precision tools, particularly where the abrasive element consists of hard abrasive grits bonded to a tool body, is to form a bond which is strong enough to permit use of the tool for cutting and other similarly demanding operations. A number of fabrication techniques have been developed in an attempt to fashion a durable, abrasive tool. For example, according to one typical process, an abrasive grit is adhesively bonded to a supporting substrate. Another process presses, air blasts or rolls an abrasive grit onto the surface of an anodizable material like aluminum and then anodizes the surface to secure the abrasive grit. However, neither of these processes, nor, in fact, any other presently known method of fabrication can produce an abrasive tool having abrasive elements which are strongly enough bound to the tool base to make the tool desirable for cutting operations. Moreover, an abrasive grit rolled on, or adhesively bonded, to a tool works loose, is spread throughout the work-piece, e.g., diamond grit in a fine watch, and must be thoroughly cleaned out to avoid subsequent damage to the work-piece.

The physical properties of many materials severely limit their desired performance at high temperatures, and under high mechanical stress and strain. For instance, the properties of an aircraft skin in large part are a limitation on the performance capability of high speed aircraft. If an aircraft skin material were available that could withstand the mechanical stresses at higher ambient temperatures and had an optimum coefficient of thermal conductivity with a better coefficient of heat transfer than those materials commonly used, higher speeds at lower altitudes would be possible.

The collection of Solar Radiant Energy requires an energy absorbing panel or material that can withstand high temperatures without physical change, and all types of weather conditions without surface deterioration. Probably the best type collecting surface is described as a "black body", but ordinarily these are laboratory test units, and are not suitable for exposure to weather conditions for long time periods. If a solar energy absorbing material were available that approached the absorptive characteristics of a black body, which had excellent mechanical characteristics so that it could be exposed to the weather elements without deterioration, and which transferred the surface radiant energy to the energy transport fluid, to be used subsequently for the extraction of its heat energy, one of the main problems for the use of Solar Energy would be solved.

SUMMARY OF THE INVENTION

It is, therefore, an object of the present invention to provide a versatile anodized article or material which can be fashioned into a suitable cutting tool and into numerous other types of surfaces requiring the thermal, metallurgical, optical and mechanical characterisitics of the article.

It is another object of the invention to provide an article having a matrix of aluminum oxide over its surface and having grown crystals of silicon dioxide projecting through the matrix, which can be rendered either abrasive or smooth depending upon its intended application.

It is still another object of the invention to provide a process for making an anodized article having in situ grown silicon dioxide crystals projecting through a supporting matrix of aluminum oxide.

It is yet another object of the invention to provide an abrasive cutting tool which requires no lubricant either before or after use, and which will not bind to the material being cut.

It is another object of the invention to provide an anodized article or material suitable as an aircraft skin or other material, which exhibits the necessary thermal, metallurgical, optical and mechanical characteristics.

Yet a further object of the present invention is to provide a novel solar energy absorbing article and method and method of making same.

Other objects and advantages will become apparent from the following description and apended claims.

Briefly stated, in accordance with the aforesaid objects, the present invention provides, in one of its embodiments, an anodized article which may assume any physical configuration on its metallic base, i.e., sheet, rod, tube or the like. The article in one form comprises an alloy layer of aluminum containing up to about 18% by weight of silicon having a matrix of aluminum oxide formed on at least a part of its surface and including crystals of silicon dioxide grown from the alloy extending through, bound in and supported by the aluminum oxide matrix. The properties of the article are determined by the silicon concentration in the alloy since the concentration determines the spacing of the silicon dioxide crystals projecting through the aluminum oxide matrix. For use as a thermal-mechanical surface, and specifically a solar energy absorbing article for example, silicon contents in the range from 10 to 18% by weight are preferred. Articles made from relatively high silicon content alloys are very smooth and non-abrasive, exhibit low thermal conductivity but high transmission of radiant energy because of its optical characterisitcs, low specific heat, low coefficient of thermal expansion, high dielectric strength, very high melting point, high tensile strength and modulus of elasticity and high surface hardness.

The process or method for making the article involves the steps of cleaning the surface of an aluminum silicon alloy, etching the alloy for a time sufficient to expose virgin alloy and particularly atomic silicon, and anodizing the etched alloy to grow silicon dioxide crystals therefrom and to form an aluminum oxide supporting matrix around the crystals.

The present invention provides an abrasive tool, suitable for use as a cutting tool, which can cut any material with a Mohs hardness equal to or less than 7, which does not require a lubricant either before or after use, which will not bind to the material being cut, and which will provide a controlled cut, without loading, of several microns depth with a single pass. The abrasive tool is made from an aluminum-silicon alloy as a supporting base and includes abrasive elements comprising grown silicon dioxide crystals electrochemically formed on and protruding from the base, the crystals being firmly bound in and extending through a supporting matrix of aluminum oxide. Preferably, the supporting base is formed of an alloy of aluminum containing less than 8% by weight of silicon. The tool is fabricated from the base alloy by the process of the present invention after first forming the supporting base to the desired configuration for the contemplated tool.

DETAILED DESCRIPTION OF THE INVENTION

Figure 1:
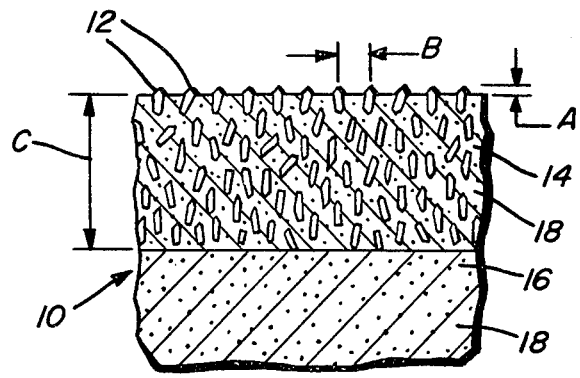
FIG. 1 is a fragmentary transverse vertical section through a sheet of the anodized article and/or solar energy absorbing article of the present invention illustrating the spatial relationship between the grown crystals of silicon dioxide, particles of silicon, the supporting matrix layer of aluminum oxide and the base alloy.

An anodized article made in accordance with the preferred embodiment of the present invention is formed of a special alloy of aluminum containing a minor proportion by weight of silicon. Preferably, the alloy is predominantly aluminum containing from small amounts up to about 18% by weight of silicon. the useful concentration of pure silicon in the aluminum-silicon alloy is limited because the alloy becomes brittle and grainy at silicon contents above 18%. In addition, the alloy may unavoidably include trace element impurities, such as copper, iron, zinc, magnesium and manganese. While these impurities are undesirable because they may react to form black or discolored layers on the composition surfaces, the reaction products can be readily dealt with by appropriate chemical rinsing. The aluminum-silicon alloys used to make the anodized article of the present invention are commercially available in varying silicon concentrations.

EXAMPLE 1

An example of an aluminum-silicon alloy used to make an anodized article in accordance with the present invention, available from the Aluminum Company of America, is ALCOA Alloy No. 4043 wire, which comprises about 4.5–6% silicon, 0.03% copper, 0.80% iron, 0.10% zinc, 0.05% magnesium and 0.05% manganese, with the remainder aluminum. Aluminum-silicon alloys are commercially available as the cladding on aluminum brazing sheet.

EXAMPLE 2

Another example of an aluminum-silicon alloy used to make an anodized article in accordance with the present invention comprises an aluminum alloy 3003 core having a thickness of about 63 mils double clad with 6 mil aluminum alloy sheet containing 7.5% silicon by weight. Aluminum-silicon alloys of these percentages made with the procedure hereinafter described have been found to be highly effective absorbers of solar energy as described more fully hereinafter.

As a preliminary procedure, the aluminum-silicon alloy is preformed or shaped to its final configuration, e.g., either as a tool, a sheet, or other form, before its surface is converted into the anodized article of the present invention.

The procedures followed with respect to the pre-anodizing treatment in general include cleaning and etching the surface to expose atomic silicon, rinsing and post-anodic treatment of rinsing, sealing and possibly baking and surface dehydration. However, it is important that hydrofluoric acid, or mixtures of hydrofluoric with nitric or other acids not be used in any of the procedural steps since silicon and silicon dioxide are removed from the surface by these acids to defeat the entire process. More specifically in the method practiced to produce the anodized article from the example alloys above described the aluminum-silicon alloys are generally contaminated with substances which may interfere with the subsequent processing of the alloy, the surfaces thereof should first be cleaned and degreased. While any well known chemical cleaning technique will be suitable, it has been found that vapor degreasing with trichlorethylene vapor at a temperature of about 189° F works particularly well. Alternatively, the aluminum-silicon alloy could be immersed in a hot solution of a suitable cleaning agent.

Next, the mother alloy base is etched to expose virgin alloy, i.e., alloy free of dirt, grease an inclusions. Care must be exercised so that only the minimum etch necessary is carried out. Too much etching tends to create an undesirable irregular surface on the alloy as a result of non-uniform etching of strain points present from the aforementioned preliminary working of the alloy to the desired configuration. Moreover, the aluminum-silicon alloy might be very thin, particularly if it is serving as the surface layer in a laminate, and unnecessary etching will only serve to thin it still further.

It has been found that the alloy may be etched to any well known etching procedure suitable for aluminum alloys. For example, a sodium hydroxide solution having a concentration of about 12 grams/liter at an etching temperature of about 150° F will satisfactorily etch the alloy in about 5 minutes. An etching solution of this concentration selectively etches aluminum surfaces and exposes silicon surfaces between the etched aluminum surfaces that protrude from as above the etched aluminum surfaces. Of course, as is well known to the skilled worker, variations in concentration, time and particularly temperature can be effected in the etching process and substantially the same results achieved. Etching at room temperature, it will be appreciated, takes too long to be commercially practical. Thus, it is desirable to etch at a slightly elevated temperature, such as 150°–170° F. Inasmuch as the etch rate is extremely sensitive to temperature change, etching at too high temperatures may become difficult to control since a satsifactory etch may be completed in a matter of seconds. Sodium hydroxide is the preferred etchant because it is inexpensive, readily available and easy to handle. However, other strong bases known for the etchant qualities, such as trisodium phosphate and others well known to the art can produce similar results.

Following etching, the alloy is rinsed in water to remove excess etchant, and, if necessary, is rinsed in a 50% solution of nitric acid at about 70° F. The latter rinsing will remove any black or discolored layers which may have formed on the alloy surfaces during the etch as a result of an interaction between the etchant and trace impurities which may be present in the alloy.

The etched alloy is next electrochemcially anodized to grow the silicon dioxide crystals and to form an aluminum oxide supporting matrix around the crystals which firmly secures them to the alloy base. The silicon-dioxide crystals grown in this manner are regularly spaced and have their optic axis perpendicular to the surface. Since the crystals are, in fact, grown from the base alloy and are a part of it, rather than merely bonded to it, they are more firmly attached to the supporting base than any known form of external bonding could accomplish. This firm bond between the crystals serving as abrasive elements and the alloy serving as a tool base is what permits the aluminum oxide-silicon dioxide composition tools of the present invention to be effectively used as cutting tools. Crystals formed by the anodizing process (grown crystals) have been found to average about 9 microns in length, with some as long as 14 microns.

After the pretreatment procedures, anodizing of the aluminum alloy is fairly standard except that hard anodizing produces a coarser appearing matrix than standard anodizing. Also, varying lengths of the silicon dioxide crystals, and thicknesses of the aluminum oxide matrix may be obtained by different procedures in the anodizing technique. One technique of anodizing is to apply a voltage of between about 12 and 20 volts to the alloy in a sulfuric acid solution. A solution concentration of about 177 grams/liter and a voltage of about 16 volts applied for about one hour has been found effective, although it is recognized, as is well known in the art, that the precise parameters for the anodization may be varied. Care should be exercised, however, that the anodization is continued only for a time sufficient to form a strong, hard matrix. When the outer surface of the matrix begins to powder and spall, anodizing has progressed sufficiently and should be terminated. It has been found that anodizing conditions can influence the fineness or coarseness of the resulting crystal structure in the composition within the limits imposed by the silicon concentration in the alloy. Thus, it has been observed that hard anodizing, i.e., anodizing at low temperatures and high voltages for short time produces a coarser structure than anodizing, for example, at room temperature and low voltages for long times.

In summary in the anodizing step the exposed silicon surfaces and etched aluminum surfaces are anodized to grow silicon dioxide crystals from the exposed silicon crystals and an aluminum oxide supporting matrix layer from the etched aluminum surfaces so that the silicon dioxide crystals are embedded in and protrude from a surface of the composite matrix layer.

The silicon dioxide crystals are regularly spaced and have their longitudinal or optic axis perpendicular to the surface. Since the crystals are, in fact, grown from the base alloy and are a part of it, rather than merely bonded to it, they are more firmly attached to the supporting base than any known form of external bonding could accomplish. This firm bond between the crystals serving as abrasive elements and the alloy serving as a tool base is what permits the tools of the present invention to be effectively used as cutting tools. Microscopic examination of the crystals formed by the anodizing process (grown crystals) shows that they average about 9 microns in length, with some as long as 14 microns. The thermal conductivity of a crystal is greater along its longitudinal or optic axis than it is perpendicular to it. Therefore, any radiant energy incident on a surface containing a multitude of these crystals is more readily transmitted to the base metal underneath, and to any gas or liquid boundary touching this metallic conducting surface. The thermal conductivity of an article in accordance with the present invention has been found to have twice as much along the axis of the crystals as in a direction normal thereto.

FIG. 1 illustrates a section through a sheet of an anodized article 10 showing the spatial relationships between the individual grown crystals 12, the silicon particles 18, the anodized layer 14, and the base alloy 16. As depicted, the anodized layer contains a mixture of grown crystals and silicon particles. In this instance the grown silicon dioxide crystals extend a distance A, from about 2–4 microns, beyond the anodized matrix. Horizontal center-to-center crystal spacing B, which depends upon the silicon content of the alloy, varies from an average of about 12 microns for alloys having a silicon content of from 4.5% to 6% by weight to an average of about 5 microns for alloys having a silicon content of about 12% by weight. It will be appreciated that the crystal spacing is determinative of the possible applications of the article. An article having a 12 micron crystal spacing will effectively cut metal having a Mohs hardness less than 7 since the crystals project into the surface irregularities of the metal and cut the metal away until the metal has a surface regularity of about 2–4 microns. On the other hand, compositions having only a 5 micron spacing between crystals are only minimally abrasive, if at all, because the crystal spacing is too small to get down into the surface irregularities of the metal. The depth of the layer, or aluminum oxide matrix layer, C, will vary with the parameters of the anodizing procedure, e.g., anodizing time. Generally, the matrix depth C will vary from 10 to about 100 microns, with the precise depth selected based upon the desired physical characteristics in the ultimate composition. A matrix depth of about 50 microns has been found to be satisfactory for most tools. However, where the composition is intended for a nonabrasive use, such as a thermal surface, a matrix depth of at least 75 microns is preferred.

Following the anodizing step, the anodized article is substantially complete. All that remains is to rinse the alloy in water at about 70° F to wash off any excess sulfuric acid or other anodizing solution, and preferably to immerse the alloy in boiling water for about 15 minutes to seal the aluminum oxide surface and make it smooth. If sealing of the surface is to be accomplished, in lieu of boiling the anodized alloy, the surface of the alloy may be dehydrated, made smoother and more regular by baking the alloy in an oven at a temperature of about 700° F. It has been found that baking removes the water in combination with the aluminum oxide matrix. An alternative sealing technique is to immerse the aluminum oxide-silicon dioxide surface in a silicon oil at about the boiling point of oil for a short time. For example, it has been found that immersion in commercially available oils, such as Dow Corning 200 silicone fluid at about 550° F for fifteen minutes, causes the surface to take up the oil. This is particulary advantageous when fabricating a cutting tool since silicon oil treatment produces a self-lubricating abrasive tool.

The process produces an anodized article having an aluminum-silicon alloy base on the surface of which is formed an aluminum oxide matrix layer. Silicon dioxide crystals grown from the aluminum-silicon alloy base are bound in, supported by, and extend through the aluminum oxide matrix. The resulting composition has the desired thermal conductivity, high dielectric stength, very high melting point, is very hard surfaced, is extremely smooth (2 to 4 micron projections are smooth to the touch), appears to have a small radar cross-section, and exhibits a dark grayish black color. Thus, it is heat resistant, has good insulating properties and low weight, all of which properties are essential and useful in an aircraft skin material. Moreover, at silicon concentrations in the alloy from 10 to 18%, and preferably 12 to 18%, the silicon dioxide grown crystal spacing is so close as to be virtually continuous. Other uses of the composition of this invention are as heat resistant coatings or liners, such as for jet engine exhaust systems, as wear resistant materials in frictional systems, such as for cylinder liners or pistons and as a thermal coating material having exceptional optical and mechanical characteristics. Depending upon its intended use, the aluminum-silicon alloy base can be formed to any desired shape. Also, the anodized article may constitute a layer or layers of a laminate. In this latter connection the anodized article may be brazed, welded, pressure bonded or otherwise adhered to other lamina, such as plastics, aluminum sheets, high strength alloys, titanium alloys, stainless steel and the like. The only limitations in forming laminates with the article of the present invention involve corrosion of the base laminate due to exposure to the elements, or corrosion due to electromotive potential differences or chemical reactions between the various lamina.

To use the process of the present invention to manufacture abrasive cutting tools, the aluminum-silicon alloy base, containing up to 8% silicon and preferably 3 to 7.5% silicon, is initially worked and formed into an appropriate configuration depending upon the ultimate intended use of the tool. Thereafter the shaped alloy may be processed to form the aluminum oxide-silicon dioxide layer. For example, two aluminum-silicon alloys were formed into rod shaped tools. One alloy comprised aluminum containing 6% silicon by weight and the other alloy comprised aluminum containing 12% silicon by weight. Each alloy contained trace amounts of various impurities. The resulting processed tools were then tested as cutting tools on metals having differing hardnesses. It was observed that the tool made from the alloy containing 12% silicon was capable of very little cutting while the tool made from the 6% silicon alloy made clean, smooth cuts. A microscopic examination of the cuts made with the 6% silicon alloy tool revealed that the cuts were exceptionally smooth and measured better than 2 microns surface discontinuity.

Figure 2:
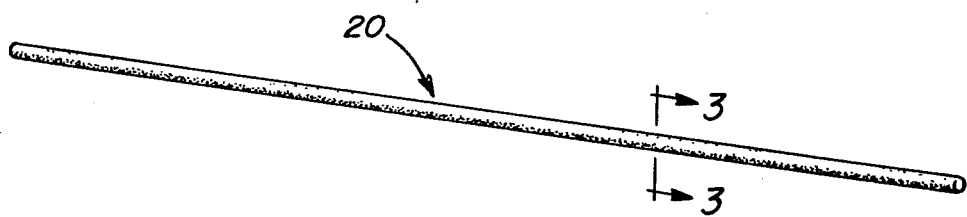
FIG. 2 illustrates an abrasive cutting tool made in accordance with the present invention.

Tools can be made according to the present invention in any form that can be extruded or machined to shape and size. For example, tools can be made in which the abrasive portion is on an interior surface, such as inside a tube, or where the tool takes on any external geometrical configuration, such as round, triangular, square, rectangular and the like. FIG. 2 illustrates at 20 just one form of tool which can be made in accordance with the present invention. Shown there is a needle file, a finishing tool used by precision machinists and instrument makers. It can be manufactured in any desired diameter, e.g., 1/16 inch or larger; in various lengths, e.g., from 3 to 14 inches; and in various external shaped, e.g., round, half-round, triangular, and the like. In addition to files, the present invention is applicable to other types of finishing tools such as grinders, hones, burring tools and the like. Furthermore, large scale finishing tools may be made by welding a bead of the aluminum-silicon alloy supporting base onto an ordinary aluminum substrate before machining the base to its final dimensions.

One notable characteristic of compositions made using the aluminum-silicon alloys specified by the present process is the remarkably uniform spacing of the silicon dioxide crystals grown from the base alloy. This is particularly important for abrasive tool applications, since the substantially equal spacing of the abrasive crystals insures that there will be no binding when the abrasive tools are used.

Figure 3:
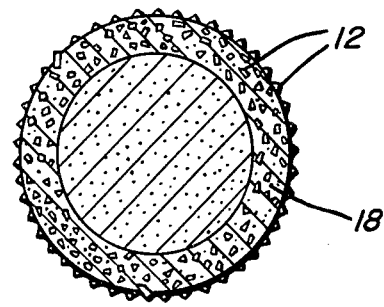
FIG. 3 is a vertical section of an abrasive cutting tool illustrating the substantially equal spacing of the abrasive crystals.

FIG. 3, which is a vertical section through the tool illustrated in FIG. 2, shows the uniform spacing of the grown crystals 12 as well as the silicon particles 18. The density of the grown crystals is a function of the silicon content of the alloy and can readily be controlled by initial alloy choice. Controlling the density of the crystals likewise permits control of the fineness or coarseness of the abrasive tools. It has been found that in alloys which are too high in silicon, i.e., in excess of about 8% by weight, the crystals are too close together to allow free cutting. Therefore, it is preferred that the silicon content of the alloy for tool applications be limited to a maximum of 8% by weight, and preferably 3 to 7.5%. Less than about 3% silicon by weight has been found to be too little to provide a desirable crystal density and is, therefore, the preferred lower limit of silicon in a tool.

Worn abrasive tools which had been made in accordance with the present invention can be easily and inexpensively refinished by repeating the essential fabrication steps. Thus, refinishing consists of re-etching and re-anodizing the worn tool until its abrasive qualities are again suitable for its particular function.

While the fabrication of tools has been described with respect to specific embodiments thereof, wherein the abrasive elements are silicon dioxide crystals grown from an aluminum-silicon base alloy and held in a supporting matrix of aluminum oxide, it is not intended to be limited thereto. Abrasive elements, such as crystals of silicon carbide, fused alumina, diamond and the like, may also be incorporated in a predominantly aluminum alloy and cutting tools fabricated therefrom. For example, an aluminum alloy may be prepared which contains silicon carbide crystals and which may be processed according to the teachings of the present invention to fabricate an abrasive tool. Thus, the alloy would first be formed to the intended tool configuration, etched to expose virgin alloy and, at the same time, to expose the silicon carbide crystals therein, cleaned and rinsed, and then anodized to form a supporting matrix of aluminum oxide around the silicon carbide crystals. Such a tool would have the advantages herein described in connection with the silicon dioxide crystal abrasive tool, yet be able to cut materials having a Mohs hardness well in excess of 7. The following table gives some of the physical characteristics of the aluminum oxide-silicon dioxide article as compared with other articles.

| Characteristics | Al$_2$O$_3$-SiO$_2$ | Aluminum Alloys | Titanium Alloys | Glass Fiber | Graphite | SiO$_2$ | Al$_2$O$_3$ |
|---|---|---|---|---|---|---|---|
| Specific Gravity | 2.5–3.0 | 2.63–2.83 | 4.43–4.77 | 2.54 | 1.50–1.64 | 2.6 | 3.0–4.0 |
| Dielectric Constant | 8.4–9.6 | N/A | N/A | 2.5 | N/A | 3.8–4.3 | 8.4–9.6 |
| Dielectric Strength (v/mil) | 400–600 | N/A | N/A | — | N/A | — | 400–600 |
| Melting Point (F °) | 2678–3722 | 930–1210 | 2730–3002 | 1500–2500 | 6000+ | 2678 | 3722 |
| Specific Heat (BTU/lb/F °) | 0.16–0.20 | 0.22 | 0.13 | 0.16 | 0.18 | 0.18 | 0.18 |
| Coeff. Thermal Expansion (10$^{-6}$in/in/F °) | 4.0–6.7 | 13.3–14.5 | 5.7–7.1 | 1.8 | 1.0–1.3 | 3.0–5.0 | 3.7–6.7 |
| Thermal Conductivity (BTU/hr · ft$^2$ · F °/ft) | 13.0–15.0 | 67.6–128.0 | 5.2–9.8 | 1.6–1.8 | 70–86 | 5.0–5.4 | 14.0–16.0 |
| Surface Hardness (Mohs) | 8–9 | 2.0–2.9 | 300–380 B | 4.5–6.5 | 0.5–1.0 | 7 | 8.9–9.2 |
| Modulus Elasticity (10$^5$lb/in$^2$) | 500–550 | 100–108 | 149–159 | N/A | 8–14 | 97 | 500–550 |
| Tensile Strength (10$^3$lb/in$^2$) | 109–144 | 59–70 | 119–155 | 204–212 | 0.4–2.0 | N/A | N/A |

Because of the excellent mechanical characteristics of the article surface, and its optical and thermal characteristics, an article of the present invention is highly suitable as a Solar Panel, and Solar Heat Pipe and as a coating.

Tests showed that the article, when heated in a furnace to 600° C, showed no change in appearance, did not oxidize and creep or flow even though the aluminum base started to melt.

Reflectivity measurements from 0.35 micron in the ultraviolet to 15 microns in the far infra-red show that the absorptivity of the material is similar to that of a black body for this parameter, and that the reflectance is near or less than 1% from 0.35 to 15 microns.

The value of any article surface to serve as a collector for solar energy depends on its ability to collect as much of the available arriving energy as possible. The surface characteristics, namely absorptivity, transmissivity, and for certain types of surfaces, emissivity of solar radiant energy, of the collecting plate determine this ability.

In an experiment performed to measure the absorptivity and emissivity of the anodized article a plate with the aluminum oxide-silicon dioxide layer on the aluminum-silicon supporting base and a plate the same size with a coating material as near as possible to a black body were mounted on an insulated test stand. Measurements showed that losses from conduction through the insulation were essentially zero. Calibrated thermocouples were placed on the backs and fronts of the test plates, and connected to graphic recorders for the temperature measurements. The test stand was inclined at an angle to obtain the maximum insolation, for the time of year, which was measured with a pyroheliometer to provide a value of the incident solar energy. From the temperature measurements the values of absorptivity and emissivity of radiant energy by the surfaces may be calculated parametrically from a derived equation. The results indicated that the article as an energy absorber were similar with that of the black body plate.

However, for the anodized article, or present coating material, the emissivity of radiation in the rear infra-red is not as important a factor as it is in those solar absorbers that function as a result of the "greenhouse effect." The greenhouse solar absorber absorbs radiant energy in the visible part of the solar spectrum, but emits it in the near infrared. A glass or plastic cover is required to trap the heat so that the entire absorbing surface and lower layers are heated uniformly by conduction. So for this type of surface the ratio of absorptivity to emmissivity, $\alpha/\lambda$, is critical.

The anodized article basically functions on a different principle, although one cannot eliminate the possibility of some infra-red re-radiation from the surface. The surface coating is composed of aluminum oxide with silicon dioxide crystals through it and projecting from the surface. In the process not all of the original silicon crystals in the alloy are converted to silicon dioxide. These particles of silicon within the matrix are opaque (good absorbers) up to 1.2 microns wavelength where they become about 50% absorbent for wavelengths up to 8 microns.

The aluminum oxide matrix is transparent to radiation from 0.18 microns to 8 microns, although there is an absorption band at 2.6 microns where there is also no incoming solar radiation. The index of refraction of this matrix layer is 1.624 so that radiation trapped within the matrix layer cannot be re-radiated outwards except over a half-angle of 38° from the normal to the layer. Likewise, the silicon dioxide crystals are transparent to radiation from 0.4 to 3 microns. Incoming radiation onto the surface is readily transmitted through it for half angles of 45° and above.

The power distribution of the solar spectrum is 5% below 0.4 microns, 93% from 0.4 to 2.3 microns and 2% above 2.3 microns.

To summarize, all of the solar power incident onto the panel from 0.4 to 2.3 microns is absorbed, and most of it is trapped within the anodized article coating. This is verified by experiments for angle of acceptance of solar radiation, temperature measurements of the panels with the coating of the anodized article during exposure to solar radiation, reflectance measurements throughout the optical spectrum and analyses and studies of the surface of the anodized article.

The table shows that the mechanical characteristics of the coating material surface of the anodized article are exceptional. The hardness of the surface shows that any material with the coating of the anodized article would be highly resistant to abrasion and corrosion. The nature of the surface would prevent chemical oxidation and deterioration due to ultraviolet radiation. Its high tensile strength and modulus of elasticity would increase the strength of most any material and especially that of a solar panel.

A comparison of the anodized article or coating of the present invention with those of a similar size using a greenhouse effect illustrate the greater transmission of solar thermal energy to the back side of the article. The temperature of the back side was measured between 6:00 AM and 6:00 PM.

| Local Mean Time | Anodized Article | Greenhouse Panel |
|---|---|---|
| 6.5 | 60° F | 60° F |
| 7.5 | 120° F | 105° F |
| 8.5 | 195° F | 170° F |
| 9.5 | 250° F | 220° F |
| 10.5 | 300° F | 250° F |
| 11.5 | 305° F | 255° F |
| 12.5 | 320° F | 240° F |
| 13.5 | 310° F | 235° F |
| 14.5 | 275° F | 210° F |
| 15.5 | 220° F | 170° F |
| 16.5 | 150° F | 125° F |
| 17.5 | 90° F | 85° F |

Although the present invention has been described with a certain degree of particularity, it is understood that the present disclosure has been made by way of example and that changes in details of structure may be made without departing from the spirit thereof.

What is claimed is:

1. A solar energy absorbing article comprising:
   an aluminum-silicon alloy base having predominantly aluminum and from small amounts up to 18% by weight of silicon;
   an aluminum oxide matrix layer grown from, a part of and extending internally of an original surface of said base and forming a physical and chemical bond with said base; and
   a plurality of silicon dioxide crystals firmly embedded in and having a portion projecting from a surface of the aluminum-oxide matrix layer, the longitudinal axis of a plurality of said crytals being substantially perpendicular to the surface of said matrix layer to conduct solar energy to the alloy base.

2. A solar energy absorbing article as set forth in claim 1 wherein said crystals have a hexagonal form and terminate beyond the matrix layer in a point.

3. A solar energy absorbing article as set forth in claim 1 wherein the surface of aluminum oxide matrix layer and silicon dioxide crystals has less than about 1% reflectivity from about 0.35 to about 15 microns wavelength.

4. A solar energy absorbing article as set forth in claim 1 wherein said aluminum oxide matrix layer and plurality of silicon dioxide crystals have a specific gravity of about 2.5 to 3.0.

5. A solar energy absorbing article as set forth in claim 1 wherein said aluminum oxide matrix layer and plurality of silicon dioxide crystals have a dielectric constant of about 8.4 to 9.6.

6. A solar energy absorbing article as set forth in claim 1 wherein said aluminum oxide matrix layer and plurality of silicon dioxide crystals have a dielectric strength of about 400 to 600 volts per mil.

7. A solar energy absorbing article as set forth in claim 1 wherein said aluminum oxide matrix layer and plurality of silicon dioxide crystals have a melting point of about 2678° to 3722 F°.

8. A solar energy absorbing article as set forth in claim 1 wherein said aluminum oxide matrix layer and plurality of silicon dioxide crystals have a specific heat of about 0.16 to 0.20.

9. A solar energy absorbing article as set forth in claim 1 wherein said aluminum oxide matrix layer and plurality of silicon dioxide crystals have a coefficient thermal expansion of about $4.0$–$6.7 \times 10^{-6}$ in/in/F°.

10. A solar energy absorbing article as set forth in claim 1 wherein said aluminum oxide matrix layer and plurality of silicon dioxide crystals have thermal conductivity of about 13.0–15.0 BTU/hr·ft²·F°/ft.

11. A solar energy absorbing article as set forth in claim 1 wherein said aluminum oxide matrix layer and plurality of silicon dioxide crystals have a surface hardness of about 8 to 9 Mohs.

12. A solar energy absorbing article as set forth in claim 1 wherein said aluminum oxide matrix layer and plurality of silicon dioxide crystals have modulus elasticity of about $50$–$55 \times 10^6$ lb/in².

13. A solar energy absorbing article as set forth in claim 1 wherein said aluminum oxide matrix layer and plurality of silicon dioxide crystals have tensile strength of about $109$–$144 \times 10^3$ lb/in².

14. An article as set forth in claim 1 wherein the thermal conductivity along the longitudinal axis of the crystals is approximately twice that of the conductivity of thermal energy in a direction along the layer normal to the longitudinal axis of the crystals.

15. An article as set forth in claim 1 wherein said alloy base has about 7.5% by weight of silicon.

16. A solar energy absorbing article comprising:
   an aluminum-silicon alloy base having predominantly aluminum and from small amounts up to 18% by weight of silicon;
   an aluminum oxide matrix layer grown from, a part of and extending internally of an original surface of said base and forming a physical and chemical bond with said base;
   a plurality of silicon dioxide crystals firmly embedded in and having a portion projecting from a surface of the aluminum-oxide matrix layer, the longitudinal axis of a plurality of said crystals being substantially perpendicular to the surface of said matrix layer to conduct solar energy to the alloy base;
   the surface of aluminum oxide matrix layer and silicon dioxide crystals having less than about 1% reflectivity from about 0.35 to about 15 microns wavelength;
   said aluminum oxide matrix layer and plurality of silicon dioxide crystals having a specific gravity of about 2.5 to 3.0, a dielectric constant of about 8.4 to 9.6, a dielectric strength of about 400 to 600 volts per mil, a melting point of about 2678° to 3722 F°, a specific heat of about 0.16 to 0.20, a coefficient thermal expansion of about $4.0$–$6.7 \times 10^{-6}$ in/in/F°, thermal conductivity of about 13.0–15.0 BTU/hr·ft²·F°/ft, surface hardness of about 8 to 9 Mohs, modulus elasticity of about $50$–$55 \times 10^6$ lb/in², and tensile strength of about $109$–$144 \times 10^3$ lb/in².

17. A method of making a solar energy absorbing article consisting essentially of the steps of:

providing an aluminum-silicon alloy base having predominantly aluminum and from trace amounts up to 18% by weight silicon;

treating a surface of the base with a solution that selectively etches aluminum from the surface to provide etched aluminum surfaces and exposes silicon surfaces between the etched aluminum surfaces that protrude above the etched aluminum surfaces; and anodizing the exposed protruding silicon surfaces and etched aluminum surfaces to grow silicon dioxide crystals and an aluminum oxide supporting matrix layer from the etched aluminum surface so that the silicon dioxide crystals are embedded in, protrude from a surface of said matrix layer and are substantially perpendicular to said matrix layer to conduct solar energy to said alloy base and said aluminum oxide matrix layer forms a physical and chemical bond with the original surface of said alloy base treated by said solution.

18. A method of absorbing solar energy comprising the steps of:

providing an aluminum-silicon alloy base having predominantly aluminum and small amounts up to 18% by weight of silicon; and forming a plurality of silicon dioxide crystals in an aluminum oxide matrix layer on a surface of the base with the silicon dioxide crystals having the longitudinal axis thereof substantially perpendicular to the surface of the matrix layer and having a portion projecting from a surface of the aluminum oxide layer to conduct solar energy applied to the projecting portions of said crystals to the alloy base via said crystals, said aluminum oxide matrix layer forming a physical and chemical bond with the original surface of said alloy base.

* * * * *